United States Patent
deCler (12)

(10) Patent No.: US 6,705,591 B2
(45) Date of Patent: Mar. 16, 2004

(54) POPPET VALVE AND METHOD OF MAKING SAME

(75) Inventor: Charles Peter deCler, Stillwater, MN (US)

(73) Assignee: Colder Products Company, St. Paul, MN (US)

( * ) Notice: Subject to any disclaimer, the term of this patent is extended or adjusted under 35 U.S.C. 154(b) by 49 days.

(21) Appl. No.: 09/970,296

(22) Filed: Oct. 2, 2001

(65) Prior Publication Data

US 2003/0062501 A1 Apr. 3, 2003

(51) Int. Cl.⁷ .............................................. F16K 31/00
(52) U.S. Cl. ...................... 251/149.1; 251/353; 251/340
(58) Field of Search ................................ 251/319, 340, 251/349, 353, 149.1, 149.6

(56) References Cited

U.S. PATENT DOCUMENTS

| | | |
|---|---|---|
| 2,859,932 A | 11/1958 | Mackal |
| 3,203,665 A | 8/1965 | Grant et al. |
| 3,219,278 A | 11/1965 | Santarelli |
| 3,523,549 A * | 8/1970 | Anderson .................. 251/353 |
| 3,525,361 A | 8/1970 | Cerbin et al. |
| 3,565,078 A * | 2/1971 | Vailliancourt et al. ... 251/149.1 |
| B 490,589 I5 | 2/1976 | Massey, Jr. |
| 4,183,498 A | 1/1980 | Hajek, II et al. |
| 4,286,636 A | 9/1981 | Credle |
| 4,436,125 A | 3/1984 | Blenkush |
| 4,478,242 A * | 10/1984 | Bond ......................... 251/353 |
| 4,501,407 A | 2/1985 | Murray |
| 4,541,457 A | 9/1985 | Blenkush |
| 4,613,112 A | 9/1986 | Philipot et al. |
| 4,703,957 A | 11/1987 | Blenkush |
| 4,909,477 A | 3/1990 | Heiman |
| 4,934,655 A | 6/1990 | Blenkush et al. |
| 4,944,977 A | 7/1990 | Shantz et al. |
| 5,033,777 A | 7/1991 | Blenkush |
| 5,052,725 A | 10/1991 | Meyer et al. |
| 5,080,133 A | 1/1992 | Johnson et al. |
| 5,090,747 A | 2/1992 | Kotake |
| 5,104,158 A | 4/1992 | Meyer et al. |
| 5,143,347 A | 9/1992 | Lee et al. |
| 5,255,713 A | 10/1993 | Scholle et al. |
| 5,312,362 A * | 5/1994 | Pfolsgraf et al. ........ 251/149.1 |
| 5,316,041 A | 5/1994 | Ramacier, Jr. et al. |
| 5,353,836 A | 10/1994 | deCler et al. |
| 5,501,426 A * | 3/1996 | Atkinson et al. ........ 251/149.1 |
| 6,036,171 A * | 3/2000 | Weinheimer et al. .... 251/149.1 |

OTHER PUBLICATIONS

"Softube fittings", Colder Products Company product brochure, Form ST–1, Rev 2–691, (4 pages).

"Softube fittings", Colder Products Company product brochure, Form ST–1, 993, (4 pages).

"General Program", product brochure by Staubli SA, 03.90, (16 pages).

"CPC Quick Couplings for Plastic Tubing", Colder Products Company product brochure, Form CP–1, Rev 2 990, 36 pages).

* cited by examiner

*Primary Examiner*—John Bastianelli
(74) *Attorney, Agent, or Firm*—Merchant & Gould P.C.

(57) ABSTRACT

A poppet valve disposed in a dispensing valve assembly includes a supporting member. The supporting member has a resilient flap. A sealing member slides over the resilient flap of the support member, so that the sealing member is not damaged or permanently deformed by the support member. Thus, the leakage is prevented when the fluid passageway is closed.

10 Claims, 7 Drawing Sheets

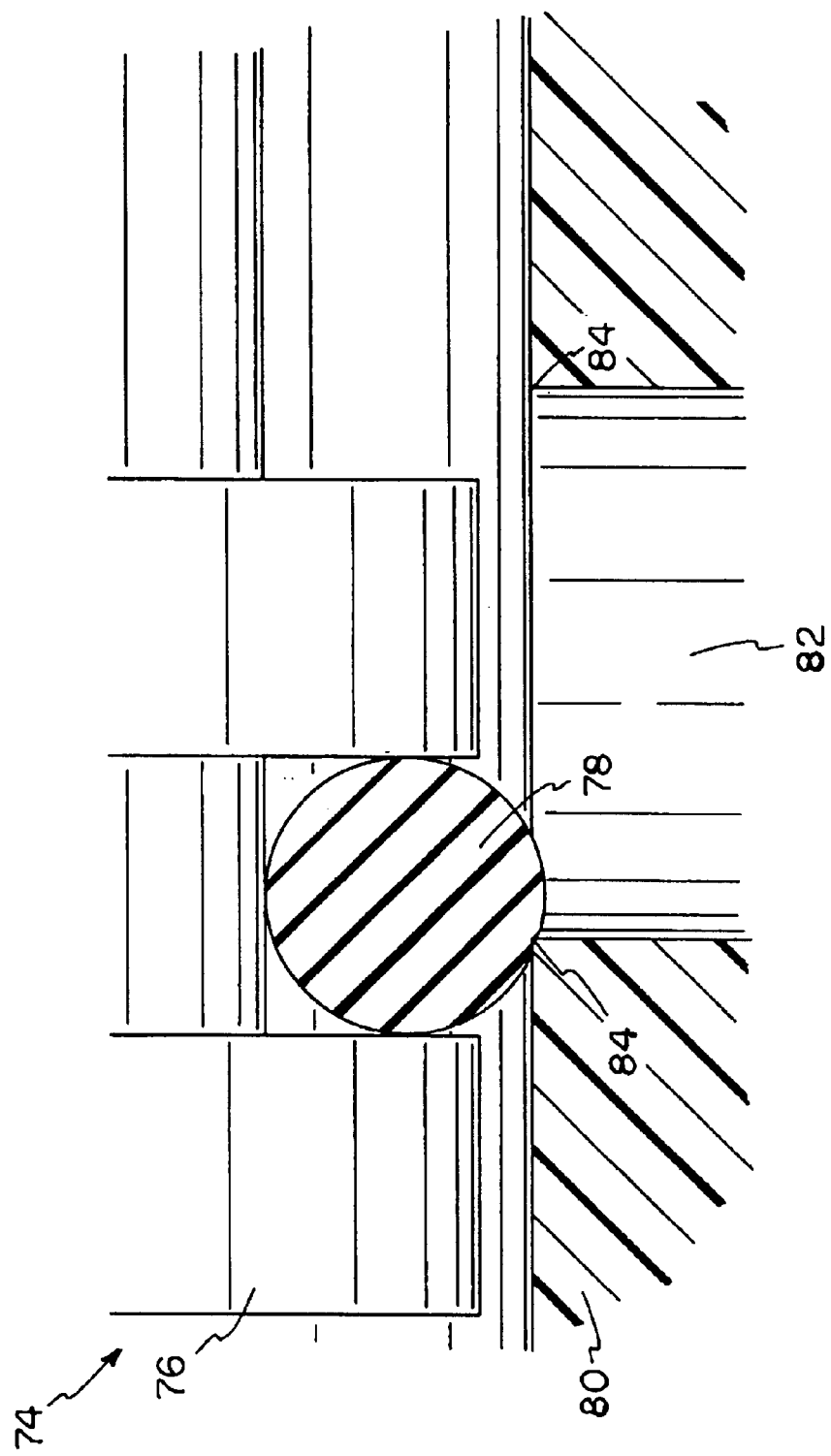

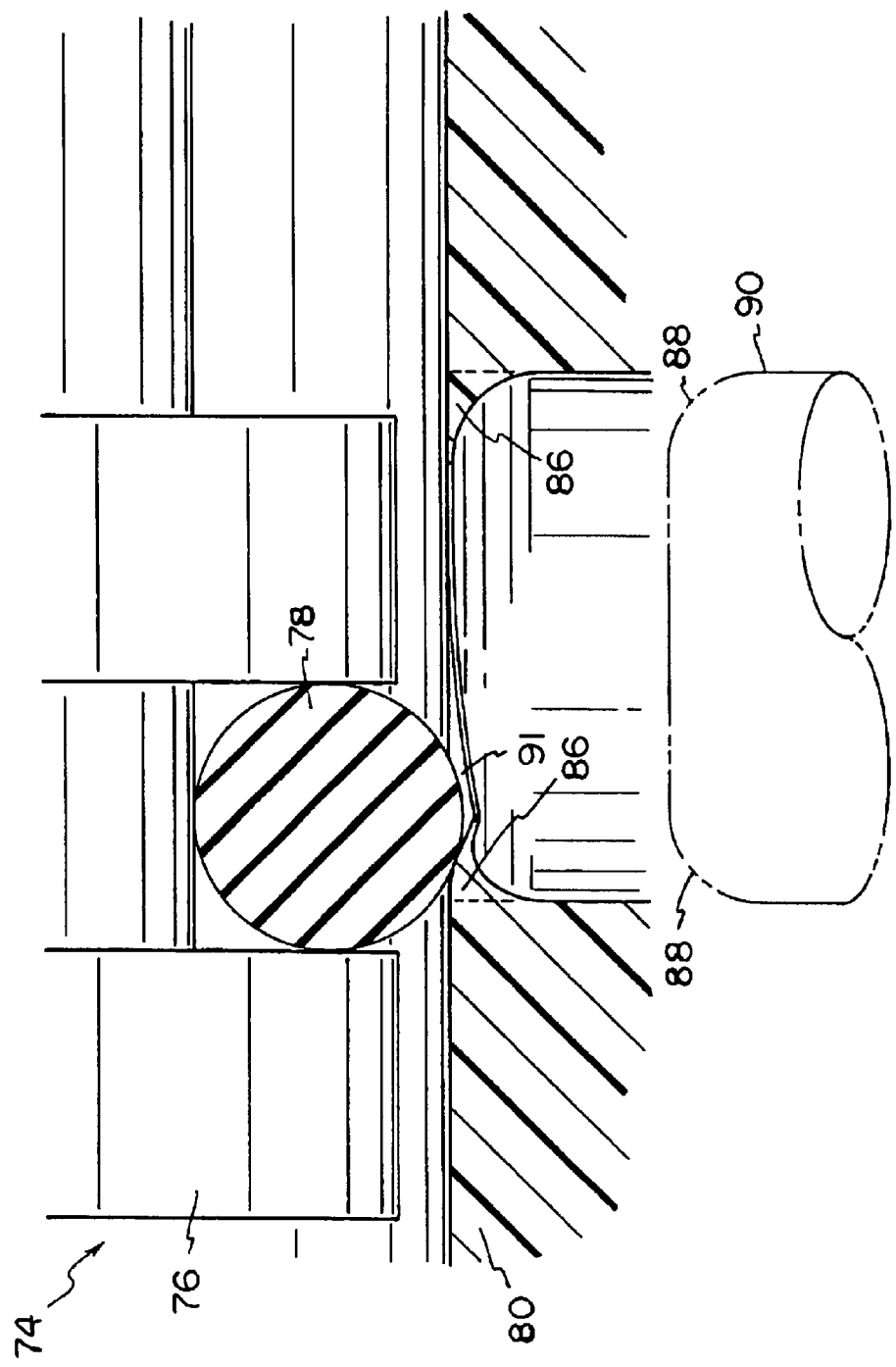

POPPET VALVE AND METHOD OF MAKING SAME

FIELD OF THE INVENTION

The present invention relates to a poppet valve, more particularly, a poppet valve used in a dispensing valve assembly.

BACKGROUND OF THE INVENTION

In an injection-molded dispensing valve assembly, a poppet valve having a supporting member is generally disposed in a fluid passageway extending through the dispensing valve assembly. The fluid passageway in the dispensing valve assembly is opened or closed by relatively reciprocating the poppet valve. The poppet valve usually displaces o-rings or other types of integral sealing members in its reciprocating movement thus establishing a seal between the poppet valve and the sealing members. Long term displacement of the sealing members may cause permanent deformation of the seal. Therefore, it is desirable to minimize the stresses placed on the sealing members.

The o-rings or sealing members are easily worn out or permanently deformed by a support member of the poppet valve because the supporting member has sharp corners. When the o-ring or sealing member slides over the supporting member, the deformation is caused. Thus, it is desirable to minimize the incidence of sharp corners on a molded poppet. Sharp corners result from the molding of the supporting member when two molding pieces abut one another to form a closed cavity into which a plastic resin is injected. The degree to which the sharp corner is present is the result of how closely the molding pieces fit together.

Researches and experiments, which are disclosed in "PARKER O-RING HANDBOOK" pp A4-6, discloses that the sealing element, such as o-ring, should never be forced over sharp corners, threads, keyways, slots, splines, ports or other sharp edges. Failure analysis, which are disclosed in "PARKER O-RING HANDBOOK" pp A9-4, proves that the damage to an o-ring during installation can occur when:

1) there are sharp corners on mating metal components such as the o-ring gland or threads over which the o-ring must pass during assembly;
2) there is insufficient lead-in chamfer; and
3) there are blind grooves in multi-port valves; etc.

As shown in FIG. 4A, there is a conventional poppet supporting member 200 molded by two molding pieces 206,208. It is impractical to eliminate the sharp corners 202,204 on the poppet supporting member 200, and it is impractical to mold a radiused edge in an area where the molding pieces 206,208 come together and where a tool parting line is present. Thus, when the poppet supporting member 200 is reciprocated in the dispensing valve assembly, the o-rings or other integral molded sealing members slide over the sharp corners 202,204 as shown in FIGS. 6A and 7A. Thus, the o-rings or other sealing members are very easily worn out or permanently deformed.

In addition, when the sharp coners 84 as shown in FIG. 8A are disposed on the inside wall of a valve assembly, the o-rings or other types of sealing members, which slidably come in contact with the sharp comers 84, are also easily worn out.

In FIGS. 4B and 4C, an accepted conventional practice is shown, wherein the "feather edge" (212) is added in the parting line area of the inner molding piece 208. It is often difficult and costly to produce the molding tool piece with the "feather edge" (212) initially, and it is prone to considerable wear and even damage in use.

It is accordingly the object of the present invention to provide an improved poppet valve that overcomes the deficiencies of the prior art.

SUMMARY OF THE INVENTION

The present invention relates to a supporting member of a poppet valve, more particularly, the supporting member of the poppet valve used in a dispensing valve assembly.

In one embodiment of the present invention, a supporting member of a poppet valve in a dispensing valve assembly includes a main body having at least one longitudinal edge and a flexible flap disposed along the longitudinal edge. The flexible flap may cooperate with a sealing portion of the dispensing valve assembly. The flexible flap may distribute an interference force exerted by the main body on the sealing portion, wherein the sealing portion may not be damaged or deformed.

In one embodiment of the present invention, the supporting member may be disposed within a housing of the dispensing valve assembly.

In another embodiment of the present invention, the resilient flap may be integrally formed on the longitudinal edge of the supporting member.

In another embodiment of the present invention, the resilient flap may be formed of a generally radius shape.

In one embodiment of the present invention, a supporting member of the poppet valve is molded by an inner molding piece, which has a reduced portion, and an outer molding piece. The poppet supporting member thus formed has a resilient flap around the area where the molding pieces interface. The flap is able to deform so as to distribute the interference forces translated to the sealing members or o-rings over a larger area thereby reducing the stress on the seal or o-ring itself. The reduction in stress may prevent permanent deformation or damage to the sealing member or o-ring.

Still in one embodiment, the supporting member of the poppet valve includes a main body that may be a longitudinal beam. The resilient flap is integral to two longitudinal edges oppositely disposed on the longitudinal beam.

In one embodiment, the supporting member of the poppet valve is disposed in a fluid passageway extending through a dispensing valve assembly. The poppet valve is relatively reciprocated inside the dispensing valve assembly to open or close the fluid passageway.

In another embodiment of the present invention, a plurality of o-rings or other types of sealing members are disposed along the fluid passageway of the dispensing valve assembly. The o-rings or sealing members slide over the supporting member of the poppet valve as it is reciprocated. The resilient flap of the supporting member distributes the stress between the supporting member and the o-rings or sealing members so as to prevent permanent deformation on the o-rings or sealing members.

In one embodiment, a molding piece for molding a side port on an inside wall of the dispensing valve assembly has round comers so as to form flaps at the opening of the side port. When the o-ring or sealing member slides over the flaps, the flap is bent so that the o-ring or the sealing member is prevented from being permanently deformed.

In one embodiment of the present invention, a dispensing valve assembly includes a housing defining a longitudinal fluid passageway through the housing, and an insert member having a sealing portion. The insert member may be insertable into the housing, and may define a second fluid passageway in fluid communication with the fluid passageway of the housing. A poppet valve may be disposed along the first fluid passageway and in fluid communication with the first and second fluid passageways. The poppet valve may include a supporting member having a main body including at least one longitudinal edge. A flexible flap may be disposed along the longitudinal edge, and may cooperate with the sealing portion of the insert member. The flexible flap may distribute an interference force exerted by the main body upon the sealing portion, wherein the sealing portion is not damaged or deformed.

These and various other advantages and features of novelty which characterize the invention are pointed out with particularity in the claims annexed hereto and forming a part hereof. However, for a better understanding of the invention, its advantages and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings in which like reference numerals and letters generally indicate corresponding parts throughout the several views.

FIG. 8A is an enlarged longitudinal section view of a conventional valve assembly having sharp corners on a side port of the inside wall of the valve assembly.

FIG. 8B is an enlarged longitudinal section view of a valve assembly having resilient flaps on a side port of the inside wall of the valve assembly.

DETAILED DESCRIPTION OF THE PREFERRED EMBODIMENT

Figure 1:
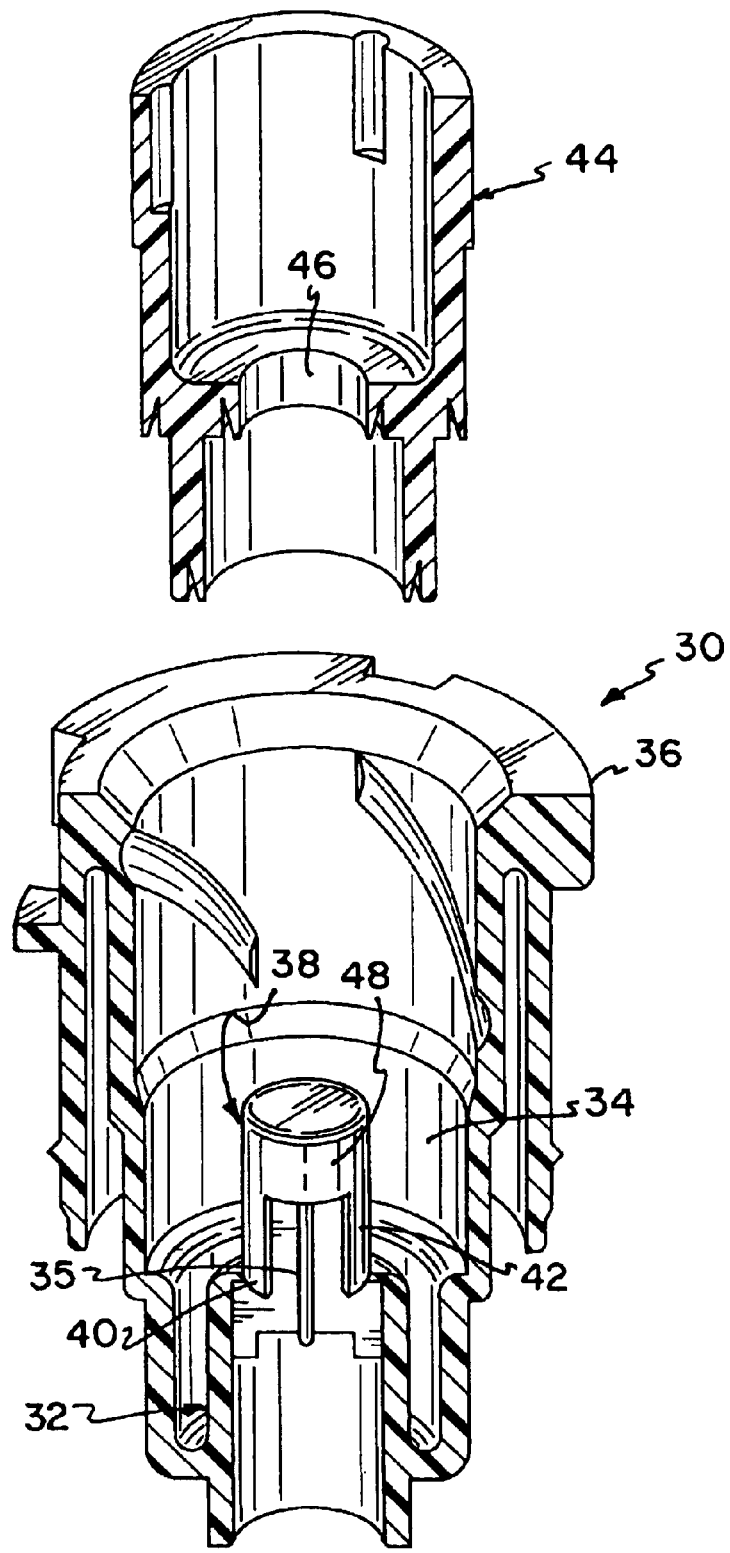
FIG. 1 is a perspective view of a female part of a dispensing valve assembly in accordance with the principles of the present invention, wherein the female part of the dispensing valve assembly is partially cut for the purpose of illustration of a poppet valve.

In FIG. 1, there is shown an embodiment of a female part of a dispensing valve assembly 30. The dispensing valve assembly 30 has a poppet valve 32 disposed in a fluid passageway 34 which is defined in a housing 36 of the valve assembly 30.

The poppet valve 32 includes a supporting member 38 having a main body 35 and two radial flaps 40,42 which may be integral with two longitudinal edges of the main body 35. Accordingly, when an insert member 44 reciprocates along the flaps 40,42, a sealing portion 46 of the insert member 44 slides over the flaps 40,42. The sealing portion 46 is not damaged or permanently deformed because the flaps 40,42 distribute the stress between the main body 35 of the supporting member 38 and the insert member 44.

Figure 2:
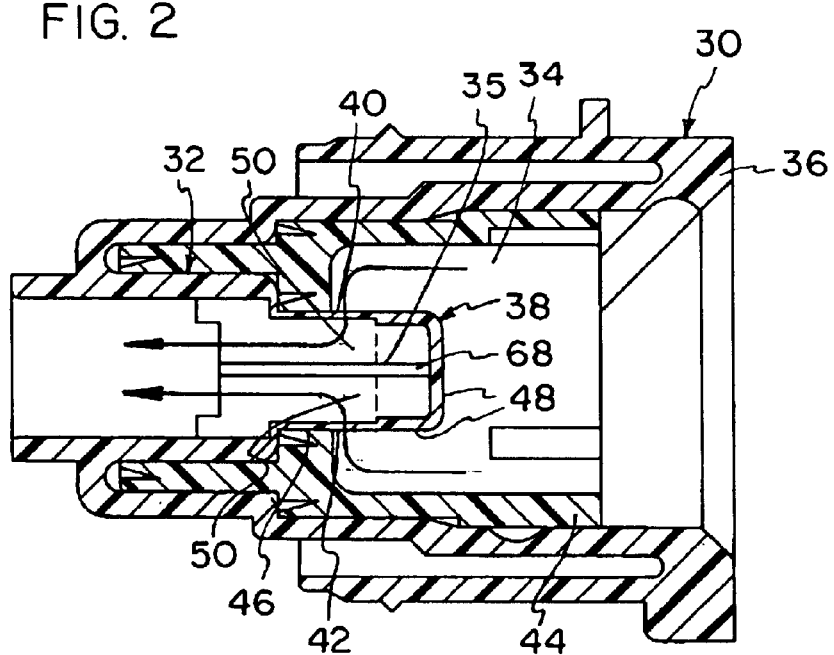
FIG. 2 is a cross-sectional view of the female part of the dispensing valve assembly shown in FIG. 1, wherein the fluid passageway is opened.

The reciprocation of the insert member 44 relative to the poppet valve 32 opens and closes the fluid passageway 34. FIG. 2 shows that the fluid passageway 34 is opened. A head portion 48 of the poppet valve 32 projects into the fluid passageway of the insert member 44 so that the fluid flows from the insert member side into the poppet valve side, as arrow indicated, through the openings 50 defined between the main body 35 and the flaps 40,42. The direction of the fluid can be vice-versa, i.e. the fluid can flow from the poppet valve side to the insert member side. Fluid may flow through the fluid passageway of the insert member and the housing through the openings 50.

Figure 3:
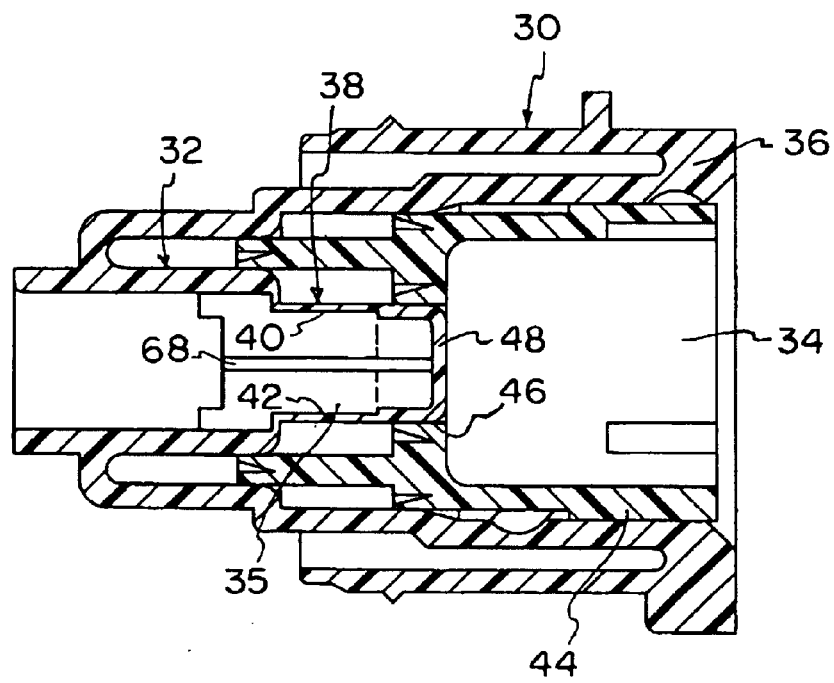
FIG. 3 is a cross-sectional view of the female part of the dispensing valve assembly shown in FIG. 1, wherein the fluid passageway is closed.

FIG. 3 shows that the fluid passageway is closed. The head portion 48 of the poppet valve 32 retracts from the fluid passageway of the insert member 44 when the insert member 44 is pulled from the housing 36, so that the openings 50 are closed by the sealing portion 46 and the head portion 48 of the poppet valve. Fluid may not flow through the fluid passageway of the insert member and the housing, as the openings 50 are closed.

The flaps 40,42 may be resilient thin pieces. Accordingly, the flaps 40,42 may be more flexible than the sealing portion 46 of the insert member 44 so that the sealing portion 46 will not be damaged or permanently deformed. Thus, the leakage is prevented when the fluid passageway is closed.

Figure 4B:
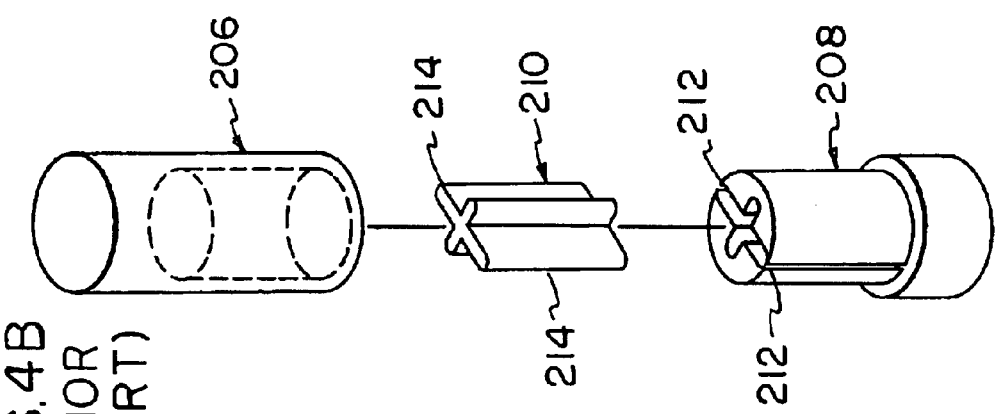
FIG. 4B is a perspective view of an improved conventional design of the supporting member of the poppet valve and a method of making the supporting member.
Figure 4A:
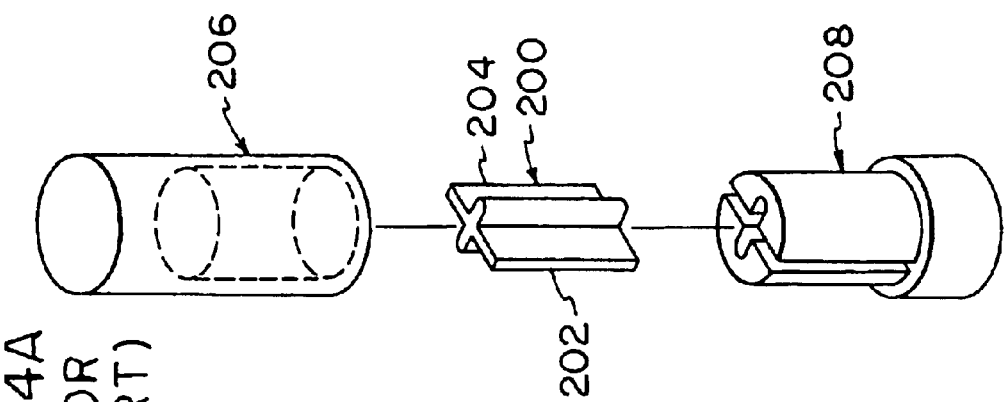
FIG. 4A is a perspective view of a conventional design of a supporting member of the poppet valve and a method of making the supporting member.

In a conventional design of a supporting member 200 as shown in FIG. 4A, the supporting member 200 has sharp corners 202,204 as opposed to having resilient flaps 40,42. Thus, when the sealing member slides over the sharp corners 202,204, the sealing portion 46 is easily damaged and permanently deformed. The supporting member 200 is molded by an outer molding tool 206 and an inner molding tool 208.

Figure 4C:
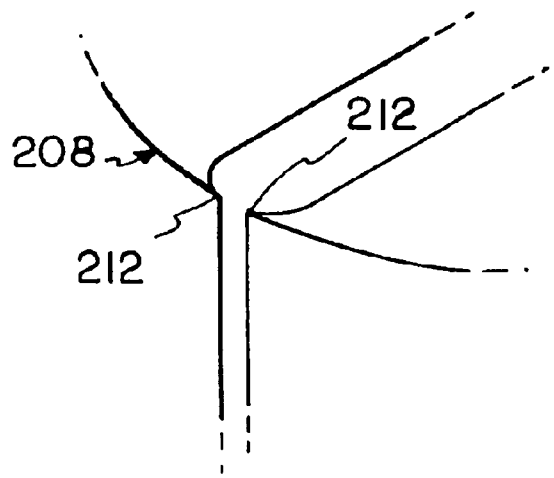
FIG. 4C is a partially enlarged perspective view of feather-edges on an inner molding piece of the improved conventional design of the supporting member as shown in FIG. 4B.

Another improved conventional design of a supporting member 210 is shown in FIG. 4B. The so-called "feather edge" 212 is added on the inner molding tool 208 so that the supporting member 210 molded from the inner and outer molding tools 206,208 has radial corners 214. The feather edges 212 are enlargedly shown in FIG. 4C. However, it is difficult and costly to produce the inner molding tool 208 with the "feather edge" 212 initially, and it is prone to considerable wear and even damage in use.

Figure 5:
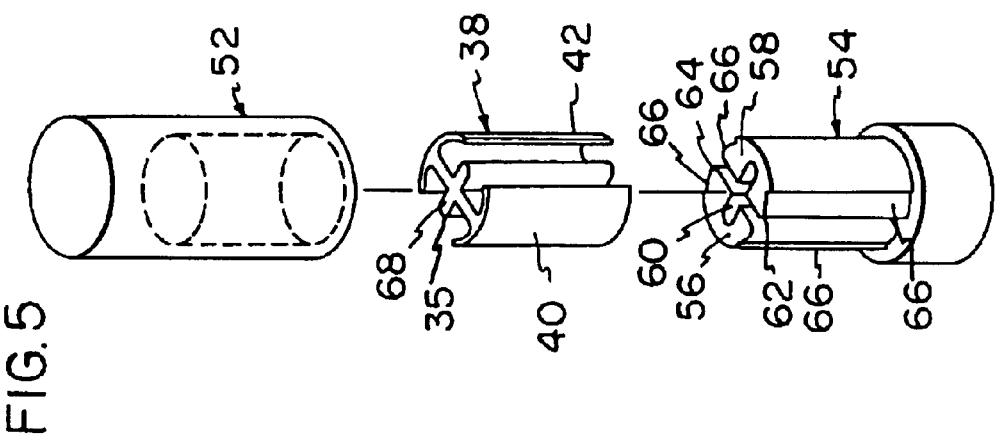
FIG. 5 is a perspective view of an embodiment of a supporting member of a poppet valve in accordance with the present invention and a method of making the supporting member.

In FIG. 5, an embodiment of the supporting member 38 is formed by an outer molding tool 52 and an inner molding tool 54. The inner molding tool 54 is received and fit in the outer molding tool 52. The inner molding tool 54 includes two spaced apart parts 56,58. A space 60 is defined between the two parts 56,58. The space 60 has two opposite edges 62,64. In the preferred embodiment in the present invention, a radius relief is cut from two sides of parts 56,58 at the two opposite edges 62,64 so that a reduced portion 66 is shown at each side of the both parts 56,58. After the inner molding tool 54 is received into the outer molding tool 52, the space 60 and a space at the reduced portion 66 are disposed between the two molding tools 52,54. A molding material, such as a plastic resin, is injected into these spaces. After separating the molding tools 52,54 from the injected material, the supporting member 38 is formed. The supporting member 38 includes a main body 35, which may be but is not limited to a cross beam 68 that may be formed from the space 60. The flaps 40,42 may be generally curvilinear or radius in shape, and the curvilinear or radial flaps 40,42 may be formed from the space between the outer molding tool 52 and the reduced portion 66. The flaps 40,42 may be integral with the cross beam 68. The thickness of the flaps 40,42 can be variable depending on depth of the relief.

Figure 7A:
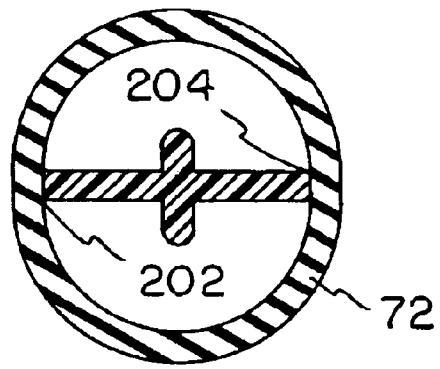
FIG. 7A is a cross-sectional view of the conventional supporting member having sharp corners as shown in FIG. 6A.
Figure 7B:
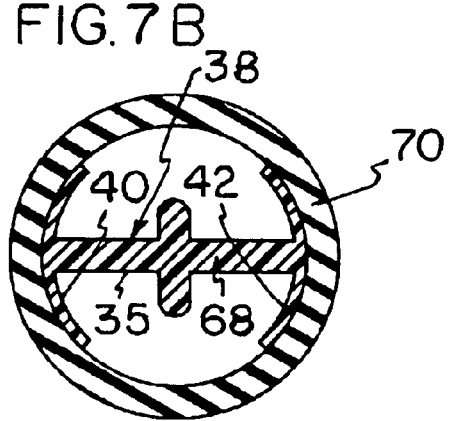
FIG. 7B is a cross-sectional view of the supporting member in the present invention having the resilient flaps as shown in FIG. 6B.
Figure 6A:
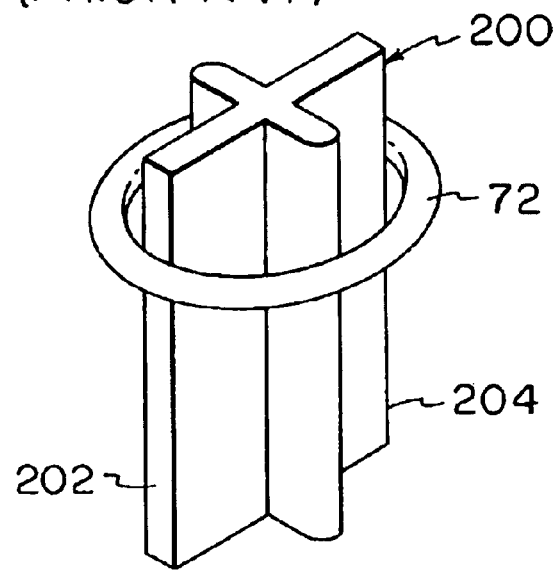
FIG. 6A is an enlarged perspective view of the conventional supporting member having sharp corners.
Figure 6B:
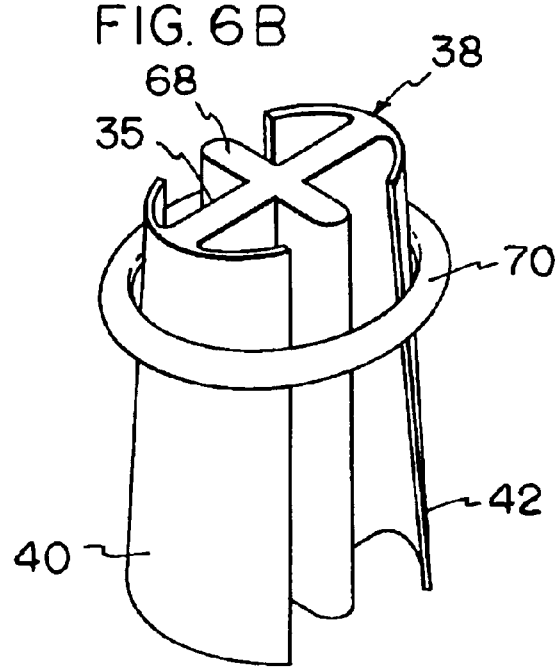
FIG. 6B is an enlarged perspective view of the supporting member in the present invention having resilient flaps.

FIG. 6B shows an enlarged view of the supporting member 38. When an o-ring 70 slides over the flaps 40,42 of the supporting member 38, the flaps 40,42 bear the stress between the main body 35 of the supporting member 38 and the o-ring 70 and distribute the stress over a larger area. FIG. 6A shows an o-ring 72 being slid over the supporting member 200 in the conventional design. The o-ring 72 is damaged or permanently deformed as shown in FIG. 7A, which is a cross-sectional view of FIG. 6A. FIG. 7B is a cross-sectional view of FIG. 6B wherein the flaps 40,42 distribute the stress over a larger area of the o-ring 70 so as to prevent the o-ring 70 from being permanently deformed.

It is appreciated that the shape of the main body 35 of the supporting member 38 can be different. It can be a rectangular beam, or triangle beam, etc.

It will be appreciated that the principles of the present invention may be used in numerous applications where there is a sliding movement between a sealing member and another part. The flap structure does not need to be located on the poppet supporting member. It might be located on an inner wall of the valve housing.

For example, FIG. 8A shows a conventional o-ring application in a valve assembly 74 having a reciprocating cylinder 76. The cylinder 76 has an o-ring 78 disposed thereon. The o-ring 78 is compressed between an inner wall of the valve housing 80 and the cylinder 76. When the o-ring 78 passes by a side port 82, a sharp corner 84 of the side port 82 deforms the o-ring 78. This may cause damage or permanent deformation to the o-ring 78.

In FIG. 8B, the valve assembly 74 includes resilient flaps 86 disposed at the corners 84 of the side port 82 in accordance with the principles of the present invention. Accordingly, when the o-ring 78 passes by the side port 82, the flap 86 which the o-ring 78 slides over is bent downward. A bending surface 91 of the flaps 86 is partially shown in FIG. 8B. Accordingly, the flaps 86 prevent the o-ring 78 from being permanently deformed or damaged. The flaps 86 are made by curved corners 88 of a molding piece 90.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

I claim:

1. A supporting member of a dispensing valve assembly with a sealing portion, the supporting member comprising:
   a main body having at least one longitudinal edge;
   a flexible flap disposed along the longitudinal edge;
   the flexible flap reciprocating relative to the sealing portion to open and close a flow path of the dispensing valve assembly, and said flexible flap distributing an interference force exerted by the main body on the sealing portion, wherein the sealing portion is prevented from being damaged or deformed.

2. A supporting member of a dispensing valve assembly with a sealing portion, the supporting member comprising:
   a main body having a first longitudinal edge and a second longitudinal edge;
   the first and second longitudinal edges being oppositely disposed on the supporting member;
   a first flexible flap disposed along the first longitudinal edge and a second flexible flap disposed along the second longitudinal edge;
   the first and second flexible flaps each reciprocating relative to the sealing portion to open and close a flow path of the dispensing valve assembly, and each said flexible flap distributing an interference force exerted by the main body of the supporting member on the sealing portion, wherein the sealing portion is prevented from being damaged or deformed.

3. The supporting member according to claim 1, wherein the supporting member is disposed within a housing of the dispensing valve assembly.

4. The supporting member according to claim 1, wherein the flexible flap is a resilient flexible flap.

5. The supporting member according to claim 1, wherein the flexible flap is integrally formed on the supporting member.

6. The supporting member according to claim 1, wherein the flexible flap is formed of a generally radius shape.

7. A dispensing valve assembly comprising:
   a housing defining a longitudinal first fluid passageway through the housing;
   an insert member having a sealing portion, the insert member being insertable into the housing and defining a second fluid passageway in fluid communication with the fluid passageway of the housing;
   a poppet valve having a supporting member being disposed along the first fluid passageway and in fluid communication with the first and second fluid passageways,
   the supporting member including a main body having at least one longitudinal edge;
   a flexible flap disposed along the longitudinal edge;
   the flexible flap cooperating with a sealing portion of the insert member and distributing an interference force exerted by the main body on the sealing portion, wherein the sealing portion is prevented from being damaged or deformed.

8. The dispensing valve assembly according to claim 7, wherein the poppet valve having a head portion and defining at least one opening between the main body and the flexible flap of the supporting member.

9. The dispensing valve assembly according to claim 8, wherein the head portion projects into the insert member when the insert member is inserted into the housing in an open configuration, enabling fluid flow through the first and second fluid passageways and the at least one opening between the main body and the flexible flap of the supporting member.

10. The dispensing valve assembly according to claim 8, wherein the head portion retracts from the insert member when the insert member is pulled from the housing in a closed configuration preventing fluid flow through the first and second fluid passageways and the at least one opening between the main body and the flexible flap of the supporting member.

* * * * *